United States Patent [19]

Hucik

[11] Patent Number: 5,118,916
[45] Date of Patent: Jun. 2, 1992

[54] CABLE MOUNTING AND REMOVAL IN FLUID FLOW ENVIRONMENT

[75] Inventor: Steven A. Hucik, San Jose, Calif.

[73] Assignee: General Electric Company, San Jose, Calif.

[21] Appl. No.: 611,607

[22] Filed: Nov. 13, 1990

[51] Int. Cl.$^5$ .................... B23K 11/10; F16L 3/08
[52] U.S. Cl. .................... 219/117.1; 248/74.1
[58] Field of Search .......... 219/117.1, 56, 78.01, 219/86.9, 87, 56.1, 56.22; 376/203, 247; 248/74.1, 74.2, 74.3, 74.4, 74.5, 65, 73

[56] References Cited

U.S. PATENT DOCUMENTS

| | | | |
|---|---|---|---|
| 2,423,627 | 7/1947 | Tinnerman | 248/74.3 |
| 2,790,614 | 4/1957 | Miller | 248/74.1 |
| 3,105,139 | 9/1963 | Russell | 219/56.22 |
| 3,152,784 | 10/1964 | Robinson | 248/74.1 |
| 3,173,639 | 3/1965 | Dunn | 248/74.1 |
| 3,519,778 | 7/1970 | Gibson, Jr. | 219/56 |
| 3,523,173 | 8/1970 | Lull | 219/56.22 |
| 4,878,639 | 11/1987 | Tempco | 248/73 |
| 4,971,272 | 11/1990 | Gudridge et al. | 248/74.5 |

FOREIGN PATENT DOCUMENTS

| | | | |
|---|---|---|---|
| 2259172 | 6/1974 | Fed. Rep. of Germany | 248/74.3 |
| 2702824 | 8/1977 | Fed. Rep. of Germany | 248/74.3 |
| 2-217177 | 8/1990 | Japan | 219/87 |

*Primary Examiner*—Geoffrey S. Evans
*Attorney, Agent, or Firm*—Robert R. Schroeder

[57] ABSTRACT

A method for tack welding a clip same to a support surface to removably secure a cable and instrumentation which may be connected on the cable in an environment wherein fluid flow is imposing loadings such as vibrations on the support surface, the environments of use including nuclear reactors, wind tunnels and the like. The restraint clip can comprise a single-piece body having a loop part wrapped around the cable and a pair of generally flat anchor plates extending codirectionally in juxtaposed relationship away from opposite ends of the loop part, the clip being fixed to the support surface by tack welding the two anchor plates to each other, and one of the anchor plates to the support surface. Removal of the clip from its fixing to the support surface preferably is effected with prying force applied to the loop part from behind the loop part with a tool anchored against the support surface.

2 Claims, 3 Drawing Sheets

CABLE MOUNTING AND REMOVAL IN FLUID FLOW ENVIRONMENT

BACKGROUND OF THE INVENTION

The present invention relates to a cable mounting method and mounting devices used therewith, and refers more particularly to a method and mounting means used for securely but readily removable mounting of cables and instrumentation carried by cables, in environments wherein fluid flow may induce flow vibrations in the structures to which the cables are secured, said fluid flow also imposing like vibration effect and other load burden on the mountings as such.

Certain operating systems and components are required to be subjected to Flow Induced Vibration (FIV) testing. For example, Nuclear Regulatory Commission regulations mandate this for prototype nuclear reactors. For execution of this required testing, various instrumentation and devices must be installed in the reactor at key locations and on key reactor components. Such devices include strain gages, accelerometers, test leads, sensors and the like, with their installation including use and presence of cables connected with the devices so that data reflecting various parameters of conditions within the reactor during the testing can be detected and recorded.

Testing in the case of a reactor will involve study of flow conditions at partial load, criticality and normal power reactor operating conditions. The flow conditions existing in the reactor may produce effects on reactor internal components, inducement of vibration in the components being of prime interest. Cable and instrument mountings also are exposed to the effects of the highly pressurized flow within the reactor and are subjected to flow induced vibration as well.

Installation of the instrumentation and cables in the reactor must be in such a manner that these elements readily withstand the vibration loading and any other force imposed on them by the fluid flow generated in the reactor so that the elements remain positioned where intended, mounted to function with reliability and accuracy during testing, and readily and conveniently removed from the reactor on conclusion of testing if required.

The conventional manner of securing cables in the reactor involves attaching them to a reactor support surface with clips tack welded to the support surface every few inches of cable run. The clips have a part-circular midpart which fits over the cable, and flat side parts extending at each side of the midpart. The side parts are tack welded to the support surface.

To remove a clip, the cable is pulled to separate the clip, a loose end of one side part is generally grasped with pliers and that side pulled or worked loose from the support surface, followed by pulling loose of the other side part while holding the first removed side part tightly with the pliers. A disadvantage of this arrangement is that the cable easily separates from the clip on removal and while the clip may still be held, the cable can drop inside the reactor and instrumentation connected thereto can be damaged. It is also possible that the clip separated from the cable can be dropped in the reactor to a relatively inaccessible location creating a burdensome task to find and retrieve the clip.

An alternative removal involves simply pulling on the cable to tear away or shear the clip midpart so the cable can be freed, the clip being left in place within the reactor. This procedure has the disadvantage of possible cable damage, and potential for loose clip residue within the reactor.

It is desirable that FIV test requirements as same relate to mounting of instrumentation, be better met in regard to testing of advanced reactor designs, with a more reliable, sure and simplified method of effecting such mountings and with mounting devices that eliminate the disadvantages of prior practice enumerated above.

OBJECTS AND SUMMARY OF THE INVENTION

Accordingly, it is an object of the invention to provide a method and means for mounting cables in fluid flow environments which overcomes the drawbacks of the prior art.

It is a further object of the invention to provide a method and means for securely but readily removably mounting cables on support structures which are exposed to a fluid flow which induces vibrations in the support structures.

It is a still further object of the invention to provide a restraint clip with which a cable can be securely fixed to a support surface but which readily can be removed without leaving any clip residue on the support surface, will not be fragmented by the removal force applied thereto, and which remains attached with associated cable.

Another object is to provide a cable restraint clip which is used to securely fix a cable to a support surface but which can be removed from such securement with simple application of a prying force beneath a loop part of the clip in which the cable is held, application of the prying force being facilitated by spaced offset of the loop part from the support surface to provide a prying tool access space.

A still further object is to provide a cable restraint clip which can be fabricated into required restraint clip configuration from a relatively thin metal strip effected by simple folding of same, but when so configured and mounted, withstands loadings imposed by very high pressure fluid flow.

Another object is to provide a tool especially suited for effecting removal of the restraint clip from an installed location thereof.

Briefly stated, there is provided a restraint clip and method by which it is used for tack welding same to a support surface to removably secure a cable and instrumentation which may be connected on the cable, in an environment wherein fluid flow is imposing loadings such as vibrations on the support surface, the environments of use including nuclear reactors, wind tunnels and the like. The restraint clip can comprise a single-piece body having a loop part wrapped around the cable part, and a pair of generally flat anchor plates extending codirectionally in juxtaposed relationship away from opposite ends of the loop part, the clip being fixed to the support surface by tack welding the two anchor plates to each other, and one of the anchor plates to the support surface. Removal of the clip from its fixing to the support surface preferably is effected with prying force applied to the loop part from behind the loop part with a tool anchored against the support surface. In accordance with these and other objects of the invention, there is provided a method for securely but readily removably fixing a cable run to a metal support surface in an environment wherein the support surface is exposed to a fluid flow of magnitude which induces vibration in the support surface. A medial length part of an elongated widened metal strip is wound around the cable run to form a strip loop closely embracing the cable run and with a first end part of the strip at one side of the medial length part folded to juxtapositioning with a strip opposite end part. One of the juxtaposed strip end parts is disposed contactingly against the support surface, a high current electric flow is passed through the strip end parts and the support surface to effect tack welding securement of the strip end parts to each other and the strip one end part to the support surface, the securement of said strip one end part to the support surface being insufficient to withstand a deliberate pull away force of predetermined amount imposed on said one end part.

According to a feature of the invention, there is further provided a restraint clip with which a cable run can be securely but removably fixed to a metal support surface in an environment wherein the support surface is exposed to fluid flow of a magnitude which induces vibration in the support surface. The restraint clip comprises a single-piece, widened, shaped body having a loop part closely encircling the cable run, and first and second anchor plates extending integrally and codirectionally away from respective opposite ends of the loop part in close juxtapositioning with each other, the loop part being laterally offset from the juxtaposed anchor plates such that one said plate unobstructedly can be disposed contactingly against said support surface so that a tack welding current passed through the plates and said support surface will secure said plates together and said one plate to said support surface with the loop part and cable run spaced from the support surface.

According to a still further feature of the invention, there is still further provided a cable mounting for use in fixedly but removably securing a cable, a cable run adjacent a test instrument connected to said run, and the like in an environment wherein a pressurized fluid flow is present so that the cable, cable run and instrument withstands any unfixing force effect created thereon by said fluid flow. The mounting comprises in combination with a metal support surface in the environment, a restraint clip having a cable encircling loop part which grips the cable, and a pair of anchor plates extending from opposite ends of the loop part in codirectional closely spaced juxtaposition one with the other, and common means connecting the anchor plates to each other and one anchor plate to the support surface, the loop part being offset relative to the anchor plates such that when the restraint clip is secured to the support surface, a sufficient space intervenes the loop part and the support surface to receive a restraint clip removal tool.

A still further feature of the invention provides a tool for removing a cable-carrying restraint clip secured to a support surface, the restraint clip including a loop part embracing the cable, and a superposed pair of anchor plates extending codirectionally away from the loop part, one of said anchor plates being in fixed contact with the support surface, the loop being offset relative to at least said one anchor plate to the extent that a space intervenes a rear side of said loop part and said support surface. The tool comprises a pair of jaw members pivoted together and pivotable in opposite first directions to a closed position, the one jaw member having a gripping inner face which can be engaged with a side of the loop part remote from the space by pivoting said jaw in its first direction. The other jaw member has long sweeping curved inner and outer faces terminating at a sharp tip end receivable in the space at the rear of the loop part, the outer curved face being convex shaped such that said other jaw pivoting in its first direction with the inner surface thereof engaged with the rear side of the loop part applies upwardly directed force to the rear side of the loop part tending to pull said one anchor plate away from the support surface and when pivoted with sufficient pivoting force being effective to fracture the fixing of said one anchor plate to the support surface.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

The present invention is concerned with readily removably or temporarily, fixedly securing cable and instruments as may be connected with the cable to support surfaces in environments where pressurized fluid flow is present. Typically, these environments will include the interiors of pressure vessels, wind tunnels and the like. Of particular importance is securement of cables and instruments in the manner aforesaid within nuclear reactor prototypes incident mandated flow induced vibration testing of a reactor as required by governmental regulation.

The manner of securement of the cable and any attached instrument should be such that these components remain secured to a support surface, such as a part of the reactor structure or a component therein, without the securement being effected or weakened by vibration or by fluid flow effects in the structure. Further, the cable mounting, per se, and instrumentation associated with a cable should be able to withstand effects of the pressurized fluid flow during all stages of the test sequence. In a reactor environment, these will be effects and created forces as attend reactor operation from cold startup to full power operation conditions, the latter, e.g., involving temperatures of up to 550 degrees F. and pressures up to about 1050–1100 p.s.i.

Figure 1:
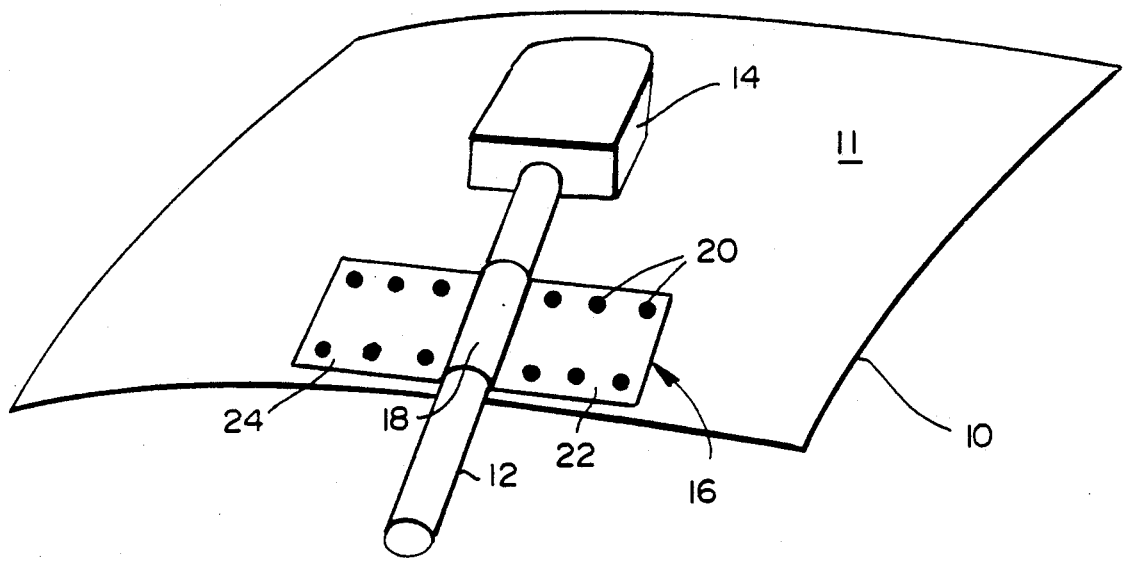
FIG. 1 is a perspective view of a cable mounting depicting one prior manner by which a cable can be temporarily removably secured with a clip to a support surface.
Figure 2:
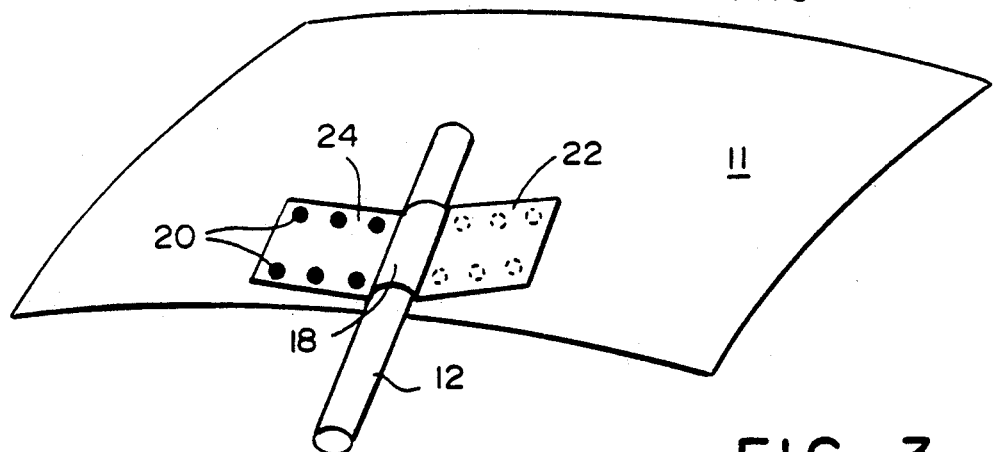
FIG. 2 is a perspective view showing an intermediate condition of the clip shown in FIG. 1 during the removal thereof from fixed position on the support surface, one side of the cable clip having been pulled loose with pliers applied force to break the tack weld holding that side to the support surface, or having been pulled away from the support surface due to a pulling force applied by the cable.
Figure 3:
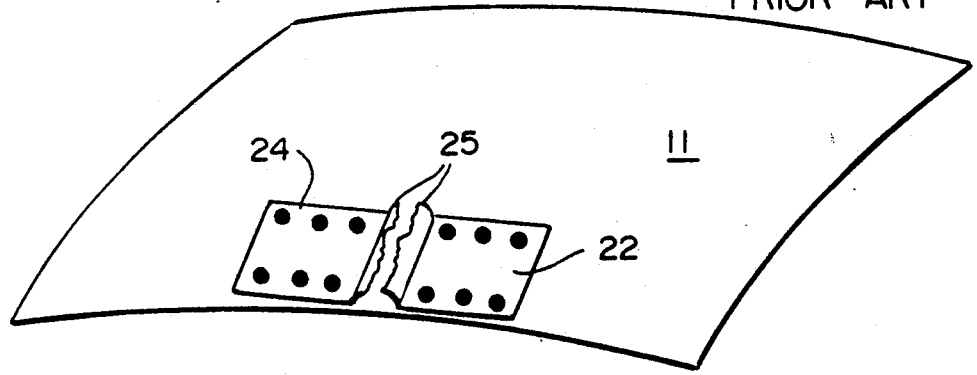
FIG. 3 is a perspective view depicting another manner of removing a prior cable mounting wherein the cable is pulled through the clip to shear the clip part overlaying the cable so the cable can be removed through the opening created in the clip, the clip residue on the support surface optionally being thereafter removed or left in place permanently.

FIGS. 1-3 illustrate prior art cable mountings used in the environments referred to above, and now will be discussed in some detail. Referring now to FIG. 1, there is shown, generally at 10, a section of a support structure which can be an interior part of the reactor vessel, or a component part therein where a cable run 12 or test instrument 14 must be placed and securely fixed, but fixed in a way that allows for removal if desired at conclusion of the testing, the support structure having a support surface 11. Test instruments used can include sensors, strain gages, thermocouples, recorders, etc. The prior manner of effecting the mounting employs a clip 16 having a semi-circular part 18 that receives the cable, and a pair of side or wing parts, 22, 24. The wing parts are tack welded as at 20 to the support surface 11 to fix the cable and instrument thereon.

When it is desired to remove the cable, one manner of doing so involves inserting a sharp tool under a corner of one of the wings to pry up a portion with which a pliers or other pulling tool can be engaged. Pulling force is then applied to that wing to break the tack welds and free up the wing. The thus far removed clip is depicted in FIG. 2. The pulling force is thereafter continued with the pliers to pull off the other wing from the support surface.

Disadvantages of this mounting and the removal of it from the support surface are several. For one, it is burdensome to initiate peel up of the first wing to a position where pliers conveniently and securely can grab the wing. Second, the cable can separate from the semi-circular part 18 and drop away from the remover's grasp. If an instrument is attached to the cable it can fall against a hard surface and be damaged. And third, the clip could be dropped necessitating its recovery possibly from a remote and relatively inaccessible part of the reactor interior.

An alternative practice for removing the cable is to employ the expedient depicted in FIG. 3. Since some of the cables involved can be heavily shielded types or even in some instances, conduit rather than a cable, pulling on the cable or conduit with the requisite force, simply pulls it through the semi-circular part 18, rending or shearing this clip structure as shown at 25. That procedure has the disadvantages that the clip residue parts may still be required to be removed, and a part of the residue may be broken off from a parent part and its recovery in a large reactor vessel, problematical. In some case, this removal mode also could damage the cable.

While the clip 16 serves adequate cable mounting function, it has the drawbacks enumerated above associated with removal. Because of such difficulties, the clip design in some cases, deters removal from the support surface as such. This choice is preferably avoided in a reactor, and particularly where a restraint clip and mounting as provided by the invention is available since same are designed to facilitate removal. Further elaboration on these is given next.

Figure 4:
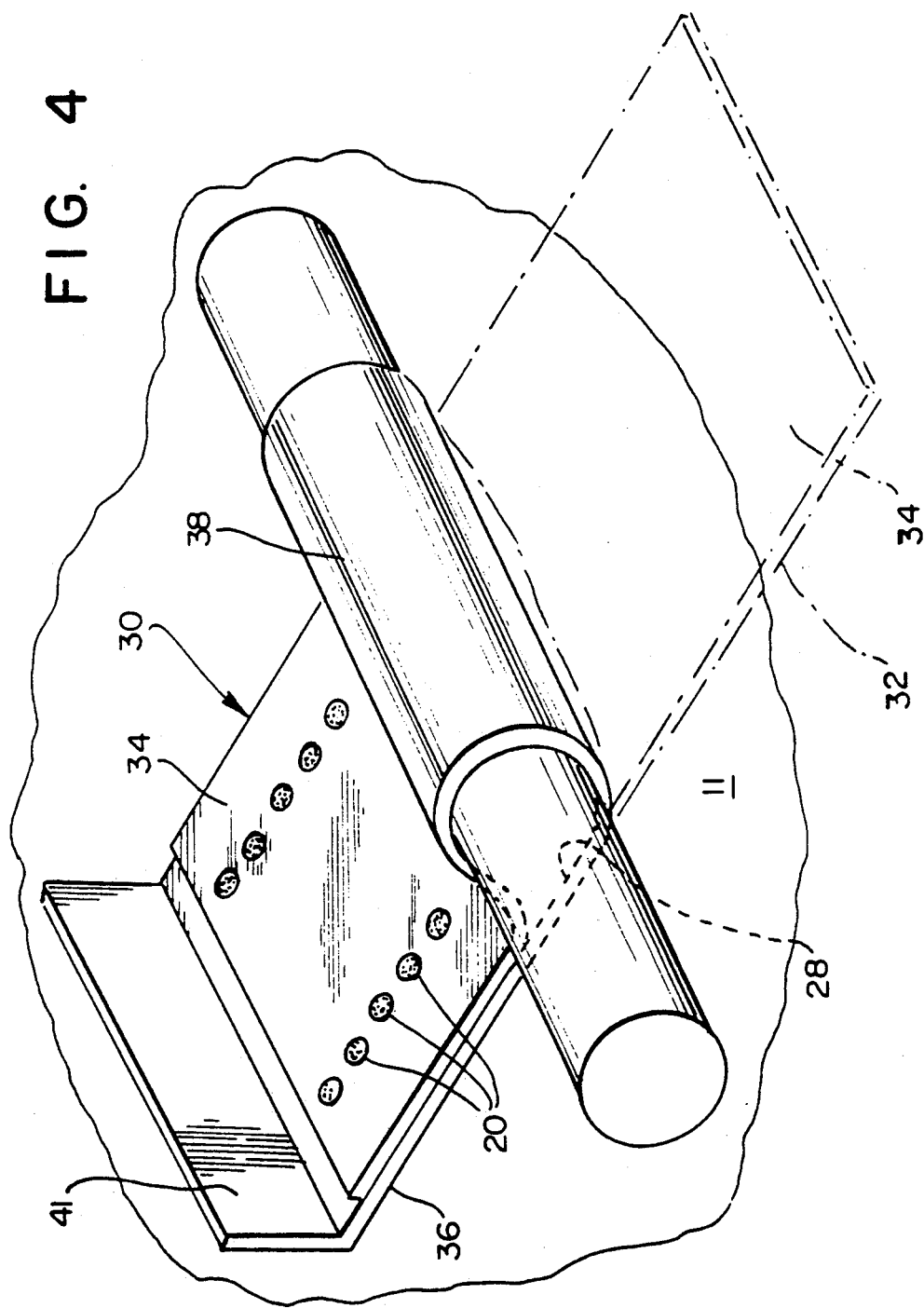
FIG. 4 is a perspective view of restraint clip constructed in accordance with the principles of the present invention, the clip being formed from a single elongated, widened metal strip, the end part of which is folded around the cable and superposed on the opposite end part being depicted in its pre-folding position in long and short dashed lines, the clip being shown tack welded to a support surface.

With reference to FIG. 4, restraint clip 30 is made from a single, elongated, widened metal strip 32, the strip in most use applications having a thickness of about 0.020 to about 0.030 inch, such thickness being one as allows ready shaping of same to the necessary clip configuration, but also provides sufficiency of structure integrity thereto to withstand the rigors presented by the use involved.

The strip has opposite strip end sections or parts as shown at 34, 36, and a central or medial length part as at 28. In FIG. 4, the medial length part and strip end part 34 are shown in their shaped positions, with the pre-formed disposition of strip end part 34 shown in long and short dashed lines. In forming the clip from the strip, the medial length part is wound around the cable as shown to form a loop part 38 of the clip which closely encircles the cable, with the strip end parts 34, 36 extending from opposite ends of the loop part, the strip end part 34 having been folded over the cable 12 to a disposition wherein it juxtaposes with strip part 36 and extends codirectionally with that part, preferably in substantial superpositioning therewith, although as will be noted later, strip part 34 may have a somewhat lesser overall length than strip part 36. The respective strip parts 34, 36 it will be seen, constitute respective anchor plates integral with the loop part.

Loop part 38 can be formed to tightly embrace the cable 12 holding it under a constraint that insures no longitudinal displacement of the cable relative thereto when the cable and an instrument connected thereto in close proximity to the restraint clip are exposed to the pressurized fluid flow in the reactor. Further, the tight holding of the cable insures that with clip removal from a fixed position thereof, the cable and instrument are removed unitarily with the clip.

The clip is securely but removably connected to support surface 11 by disposing the underface of anchor plate 36 in contact with support surface 11, and then with suitable electrode elements of a spot welding means oriented to effect such purpose, passing a high current electric flow through the anchor plates and the support surface at various plural and discrete locations to cause spot welding together of the anchor plates to each other and of anchor plate 36 to the support surface.

As will be noted from FIGS. 4 and 5, the loop part 38 of clip 30 is offset relative to the codirectional dispositioning of the generally flat anchor plates, and this results in the loop part and cable held therewith when the clip is mounted on the support surface, extending spaced some distance from that surface so that a space 40 (FIG. 5) is provided behind the loop part for reception of a removal tool as will be detailed below.

Figure 5:
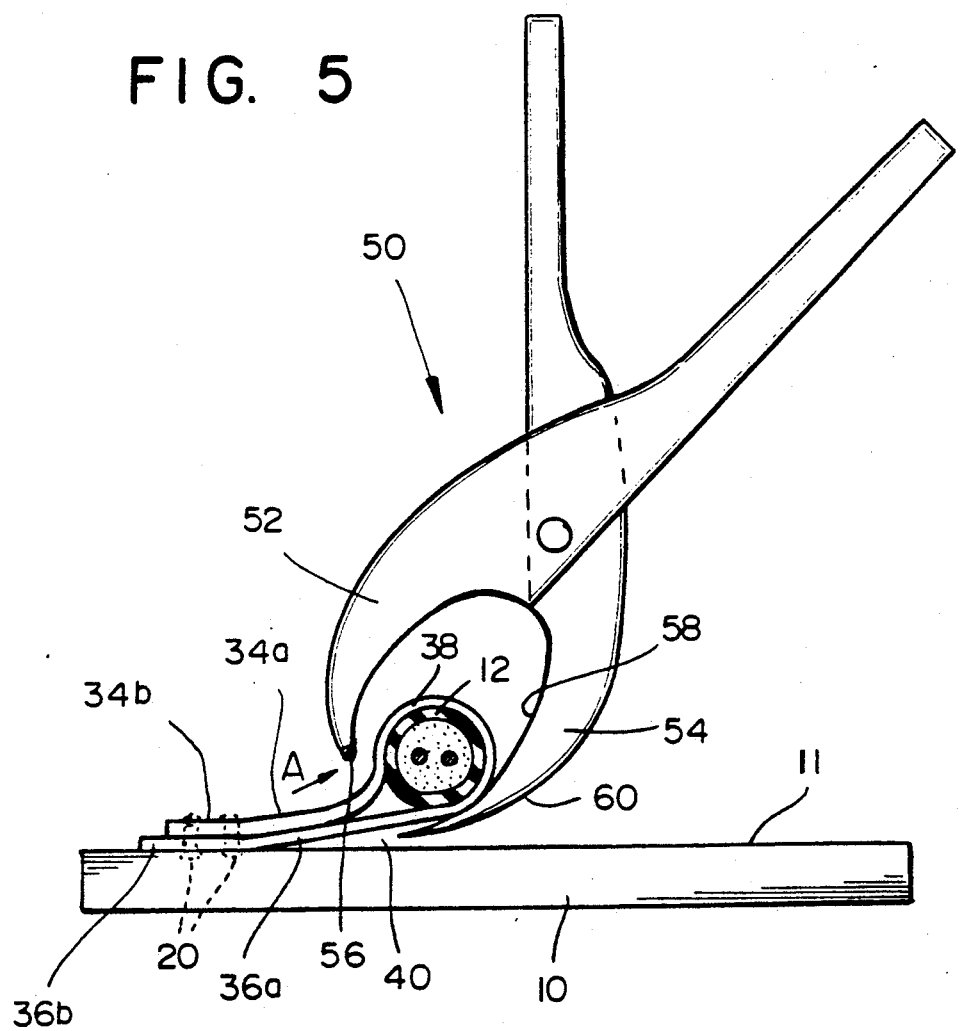
FIG. 5 is a side elevational view of a modified form of clip in which a portion of each anchor plate remote from the loop part is disposed angled relative to the anchor plate portions proximal the loop part, there further being shown how a removal tool is employed to remove the clip and cable carried thereon from the support surface position.

FIG. 5 illustrates, inter alia, the feature that the anchor plates 34, 36, can be formed such that each includes a respective portion 34a, 36a, proximal the loop part, which said portions are skewed or angled relative to the plate portions 34b, 36b, which are distal or remote from the loop part. By configuring the clip in this fashion, the loop part will be further spaced from the support surface enhancing the space available for accessing a removal tool behind the loop part.

Plate portions 34a, 34b, 36a and 36b are in the depicted embodiment planar, although they, and particularly the distal plate portions, could have contours differently configured and in correspondence to the shape of the support surface to which anchor plate 36 is attached. The anchor plates in the FIG. 4 clip embodiment are also generally flat planar since the clip of that FIGURE is intended for mounting on a flat support surface 11.

Removal of a clip 30 from its fixed attachment to a support surface will described with reference to FIGS. 5 and 6. Removal of the clip requires exertion of a pulling force on the clip structure sufficient to break the weldment holding anchor plate 36 to support surface 11. Preferably, this will be provided in the form of a prying force directed against the loop part from behind such part and with a tool inserted between the loop part and the support surface, the support surface serving as an anchorage against which the tool can be manipulated.

Other ways of removing the clip can be used. For example, the anchorage plate 36 can be made somewhat longer than anchor plate 34 so that a tip end length segment of anchor plate 36 can be bent at an angle, e.g., orthogonally or at a lesser degree less than that measure, to the main part of such plate and in the direction of and extending for some distance beyond anchor plate 34 so that such bent segment can serve as a gripping tab 41 which can be gripped with a pliers or similar tool to pull the clip loose from the support surface.

One of ordinary skill in the art will understand and recognize, given the clip material and dimensions, and the forces acting on the mounting during testing, the requirements of the weldment which must be made to securely hold the clip and cable on the support surface. In like manner, he will know the magnitude of force which must be exerted on the weldment through the clip structure to break this bond.

Referring again to the manner of prying removal of the clip, a tool such as the tool 50 shown in FIG. 5 can be used for such purpose. Tool 50 generally resembles a pliers in that it has a pair of pivoted together jaws 52, 54, jaw 52 being primarily a gripping member, and jaw 54, primarily a prying or force applying component for applying pulling force to the clip loop part from the rear side thereof and to the underside of anchor plate 36 when access to same is achieved in course of operation of the tool. The jaws are adapted in usual manner to pivot in opposite directions, i.e., pivoting of each in first directions, closes the jaws.

Figure 6:
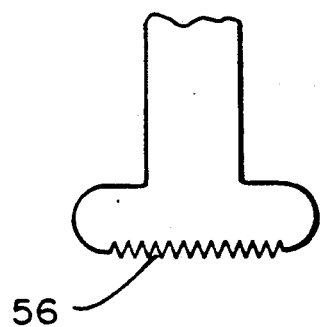
FIG. 6 is a fragmentary elevational view of the gripping jaw of the removal tool shown in FIG. 5 as viewed in the direction of arrow A in that FIGURE.

Tool jaw 52 as seen in FIG. 6, has a saw-tooth or serrated inner face 56 engagable with the clip at the outer surface of the clip generally in the region of juncture of the loop part and anchor plate 34, and when the jaw is pivoted in counterclockwise direction to cause such engagement. This gripping of the clip with jaw 52 and maintenance of the force effecting same works in cooperation with the clockwise pivoting force applied to jaw 54 to enable the user to insert jaw 54 under the loop part, and then to advance progressively more and more under the anchor plate 36 to apply upwardly directed force against the anchor plate 36.

To facilitate accessing the space behind the loop part 38 and also beneath the anchor plate 36 region adjacent the loop part, and to further operate to direct force upwardly against the clip that tends to pull it away from it welded joinder to the support surface when the jaw is pivoted clockwise, jaw 54 is specially configured. This special configuration includes the long sweeping concave inner jaw face shape 58, and the long sweeping convex outer jaw face shape 60, these faces having different radii of curvature as is evident and designed to provide face intersection in the sharp tip end juncture depicted. It is readily seen that continued clockwise pivoting of jaw 54 and a sufficient force application in excess of the magnitude of clip holding force will fracture the weldment of anchor plate 36 with the support surface freeing the clip and allowing its removal along with the cable gripped therewith from the use environment.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A method for securely but readily removably fixing a cable run to a metal support surface in an environment wherein the support surface is exposed to a fluid flow of magnitude which induces vibration in the support surface, said method comprising
   winding a medial length part of an elongated widened metal strip around the cable run to form a strip loop closely embracing said cable run and with a first end part of the strip at one side of the medial length part folded to juxtapositioning with a strip opposite end part,
   laterally offsetting the loop part relative to strip end parts remote therefrom by skewing strip end parts proximal the loop at an angle relative to said remote end parts,
   disposing one of the juxtaposed strip end remote parts contactingly against the support surface with the offset loop spaced a distance from the support surface, and
   passing a high current electric flow through the juxtaposed strip remote end parts and said support surface to effect tack welding securement of said strip remote parts to each other and of said strip one remote end part to said support surface, the securement of said strip one remote end part to said support surface being insufficient to withstand a delibrate pull away force of predetermined amount imposed on said one remote end part with a tool accessing the space between said support space and said loop and with which prying force is applied to said loop.

2. The method of claim 1 in which said one remote end part has a tip end extending longitudinally of a corresponding tip end of the other strip remote end part, said one remote end part tip end being bent in the direction of and beyond said other strip remote end part to constitute a tab which can be gripped with a tool for applying thereto a removal force with which the tack welded securement of said one remote strip end part to said support surface can be broken.

* * * * *